June 19, 1923.

G. F. MYERS

VEHICLE

Original Filed Aug. 23, 1909  5 Sheets-Sheet 1

Inventor: George Francis Myers

June 19, 1923.

G. F. MYERS

VEHICLE

Original Filed Aug. 23, 1909     5 Sheets-Sheet 2

1,459,411

Inventor:
George Francis Myers

June 19, 1923.

G. F. MYERS

VEHICLE

Original Filed Aug. 23, 1909 5 Sheets-Sheet 3

1,459,411

Patented June 19, 1923.

1,459,411

UNITED STATES PATENT OFFICE.

GEORGE FRANCIS MYERS, OF NEW YORK, N. Y.

VEHICLE.

Original application filed August 23, 1909, Serial No. 514,165. Divided and this application filed November 20, 1916. Serial No. 132,359.

*To all whom it may concern:*

Be it known that I, GEORGE FRANCIS MYERS, a citizen of the United States, and residing at New York city, in the county of New York and State of New York, have invented a new and useful Vehicle, of which the following is a specification.

This invention relates to a vehicle, and has the object to provide an improved frame for the body, car, or the like of the vehicle, which is light and strong in construction, to provide improved means for sustaining the vehicle in the air, and to provide improved means for stabilizing the said vehicle.

To these ends the invention consists in certain novel features which I will now proceed to describe and will then particularly point out in the claims.

This application is a division of my companion application filed August 23, 1909, and serially numbered 514,165.

In the accompanying drawings consisting of 3 sheets.

Similar characters of reference denote corresponding parts throughout the several views.

The construction of the vehicle is substantially and preferably as follows:

The main frame or body of the machine has the general form of a hollow or tubular horizontal cylindrical body which is provided with conical front and rear ends and comprises a plurality of transverse circular girders 1 arranged axially in line, a plurality of longitudinal girders 2 connecting the several circular girders at different parts of their peripheries and front and rear heads 3, 4 with which the front and rear ends, respectively, of the longitudinal girders are connected. Each of the circular girders consists of an outer circular bar, ring or hoop 5, an inner circular bar, hoop or ring 6 arranged concentrically within the outer ring and in the same transverse plane, and spacing pieces, blocks or struts 7 arranged between the inner and outer rings and connected therewith by bolts, screws, rivets or other suitable means. The circular girders of these parts of the frame which do not permit of an internal obstruction, as for instance the part containing the compartment for the operator, are not provided with any transverse braces, as shown in Fig. 5, but those circular girders which permit partial obstruction of the internal space may be provided with braces 8 arranged to form a square, as shown in Fig. 7, while those circular girders in which the internal space is not utilized may be provided with braces 9 which cross each other, as shown in Fig. 8.

Figures 4, 7:
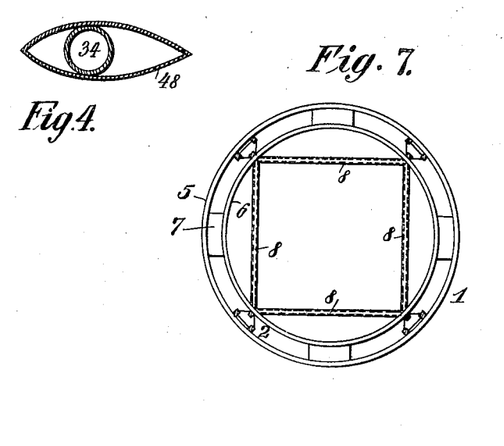
Fig. 4 is a horizontal section, on an enlarged scale, of one of the plane supporting masts or uprights and its guard or deflector.
Fig. 7 is a vertical cross section on line 12—12, Figure 1, on an enlarged scale, showing another form of the circular frame members.
Figure 5:
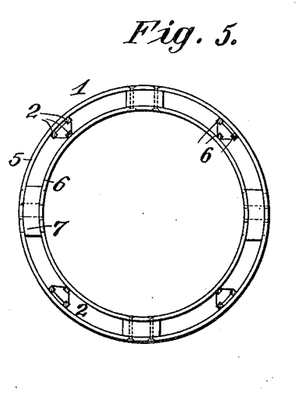
Fig. 5 is a vertical cross section on line 10—10, Figure 1, on an enlarged scale, showing one form of transverse hoop or circular frame members employed in the frame of the machine.
Figure 6:
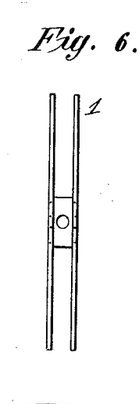
Fig. 6 is a side elevation of the same.
Figure 8:
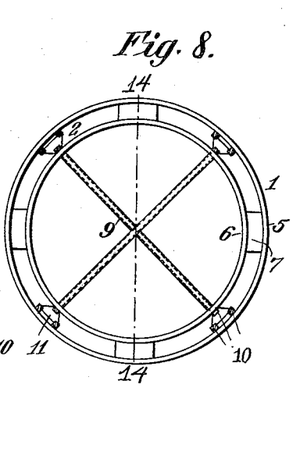
Fig. 8 is a vertical cross section on line 13—13, Figure 1, on an enlarged scale, showing still another form of the circular frame members.
Figure 9:
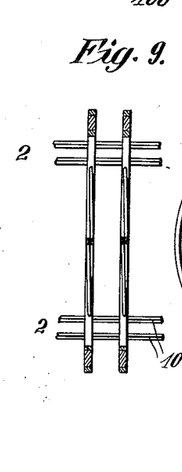
Fig. 9 is a vertical longitudinal section on line 14—14, Fig. 8.

Each of the longitudinal girders comprises three longitudinal bars 10 which are arranged to form a triangle and are secured by any suitable means to the opposing sides of the inner and outer rings of the circular girders and connected with each other at suitable intervals in the length thereof by means of struts or space blocks 11, as shown for instance in Figs. 7 and 8.

Figures 10, 11, 12, 13, 14, 15:
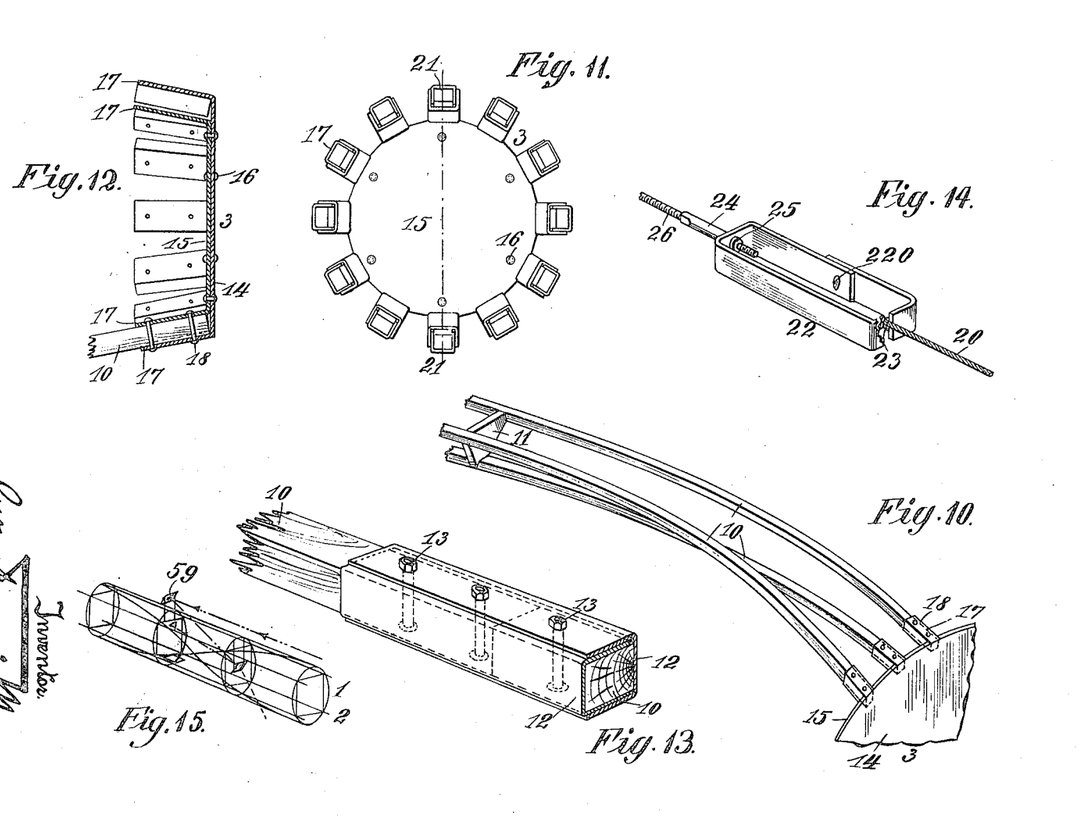
Fig. 10 is a fragmentary perspective view of one of the longitudinal girders and one of the heads of the frame.
Fig. 11 is a detached inside elevation of one of the frame heads.
Fig. 12 is a fragmentary longitudinal section on line 21—21, Fig. 11.
Fig. 13 is a fragmentary sectional perspective view showing the means for connecting the bar sections of a girder.
Fig. 14 is a perspective view showing the means for tightening the tension members or guy wires or ties of the frame.
Fig. 15 is a fragmentary perspective view of the frame showing the arrangement of the periscopes whereby the operator is enabled to look ahead of the machine.

The opposing ends of the rings and the bars of the circular and longitudinal girders may be connected by various means but by two U-shaped coupling pieces 12 which are applied to said frame members across the joint between the same, so that the cross plates thereof bear against opposite sides of the frame members while their legs overlap each other and are secured to each other and the frame members by bolts 13, as shown in Fig. 13 or otherwise. The rings and bars of the circular and longitudinal frame girders and the struts are made of wood.

Each of the end heads of the frame comprises two vertical flat sheet metal disks 14, 15 which are arranged transversely and secured flatwise against each other by rivets 16, as shown, or otherwise, and each disk being provided at its periphery with U-shaped clips 17, the clips of the two disks having their legs overlapping each other and forming an annular row of sockets, as shown in Fig. 11, in which the adjacent ends of the longitudinal frame bars are seated and secured by rivets 18 each of which passes through a pair of clips and the frame bar between the same, as shown on the lower part of Fig. 12.

Figure 1:
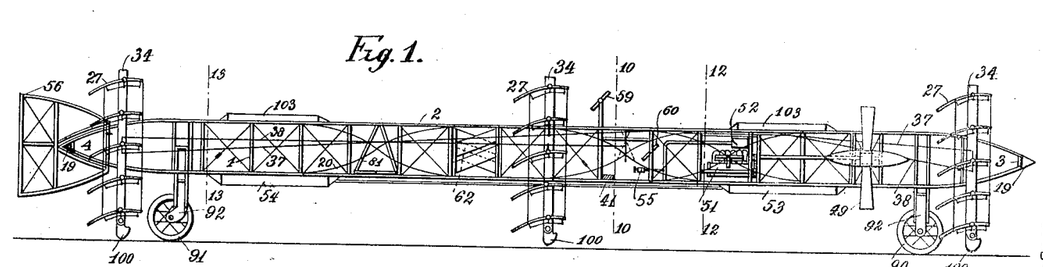
Figure 1 is a side elevation of a body or car or fuselage attached to a flying machine and embodying my improvements.
Figure 2:
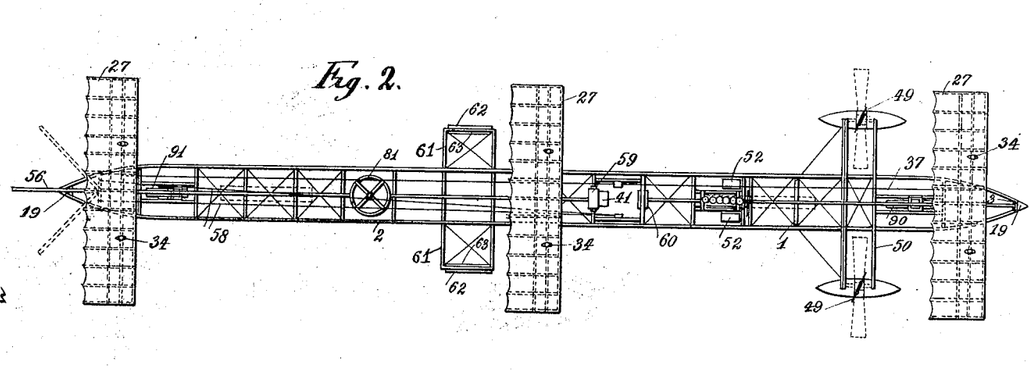
Fig. 2 is a top plan view thereof.

In order to complete the conical formation at each end of the frame a conical nose or nose piece 19 of sheet metal or other suitable material is secured with its base to the outerside of the flat head of the frame, as shown in Figs. 1 and 2.

For the purpose of stiffening the girders of the frame, tension members, ties, guys or wires 20 are provided which extend diagonally or obliquely relatively to different parts of the frame in all available directions and which are secured at suitable points to the frame work so as to rigidly connect different members of the frame and securely unite them.

For the purpose of permitting the tension members of the frame to be drawn taut each of these members is divided at any suitable place and the opposing ends of the sections connected by a turn buckle which comprises a frame 22 constructed by bending a sheet metal strip into the rectangular form and overlapping the ends thereof on the side of the frame and connecting the same by a rivet 220. The end of one tension wire section passes through an opening in one end of the turn buckle frame and is secured thereon by means of a knot or enlargement 23 on said section and bearing against the inner side of the turn buckle frame, and an internally screw threaded nut 24 is journaled in an opening in the other end of the turn buckle and provided with a flange or shoulder 25 bearing against the inner side of the frame and adapted to receive an externally screw threaded shank 26 on the other tension wire section, as shown in Figure 14.

If desired, a skin or covering may be applied to the outerside of the frame to protect the parts within the frame, which covering may be transparent either wholly or in parts, to permit of looking either into the frame or out of the frame without necessitating removal of the covering.

Figure 3:
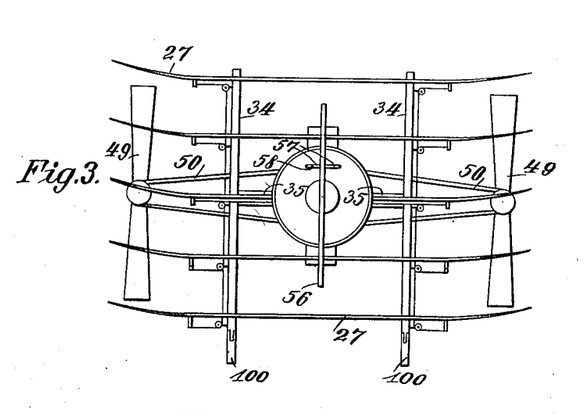
Fig. 3 is a rear end elevation of the same, on an enlarged scale.

Near the front or rear ends and the center of the frame or body, or car, or fuselage, the same carries front, rear and central sets of planes 27 whereby the machine is raised in the air. Each of these sets of planes contains two complete upper and two complete lower planes which extend transversely above and below the frame, and a divided intermediate plane the sections of which are arranged on opposite sides of the frame, as shown in Figure 3. Each of the planes preferably comprises a skeleton or frame comprised of a plurality of transverse ribs 29, 30, 31 Figure 19, and a plurality of flexible longitudinal ribs 32 connecting the transverse ribs and a covering 33 of fabric applied to said ribs. The planes of each set are pivotally supported on the main frame, so that they can turn vertically this being preferably effected by journaling the central transverse rib 30 of each plane in bearings formed on masts or uprights 34 arranged on opposite sides of the main frame and connected with the latter midway of their height by horizontal arms 35.

The several planes of each set are connected on opposite sides of their pivots by cords or connecting members 36, so that they are compelled to turn together. The operator is able to turn the planes of each set in one direction or the other for causing the machine either to rise or descend in the air by means of two cords or lines 37, 38 connected with diametrically opposite arms 39, 40 on the pivot rib of one or more of the planes and leading to the operator's compartment which is arranged near the center of the frame and provided on its bottom with a seat 41 for the operator. When it is desired to cause the machine to ascend the operator pulls the cord 37 so as to tilt the front ends of the planes upwardly, but when it is desired to cause the machine to descend the operator pulls on the line or cord 38 so that the front ends of the planes tilt downwardly.

Figure 16:
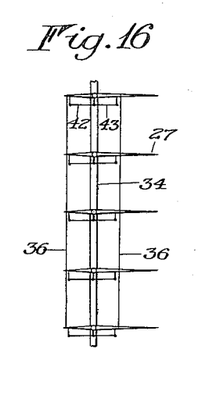
Figures 16 and 17 are side elevations of one set of planes and associated parts showing different positions of same.
Figure 17:
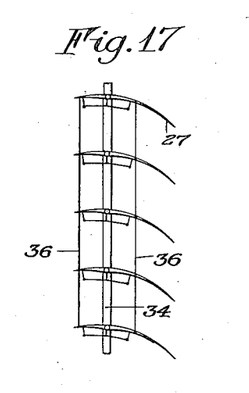
Figure 18:
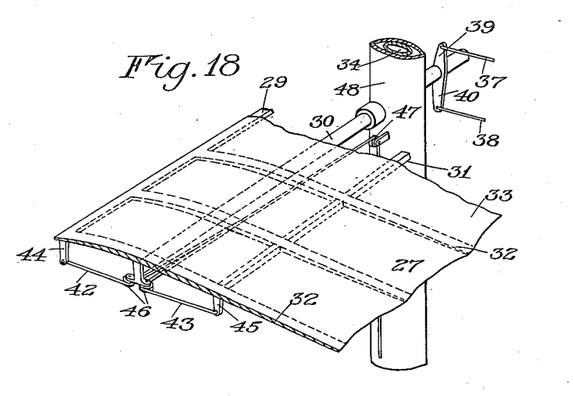
Figure 18 is a fragmentary perspective view of one of the planes, its support and the means for flexing same.

In addition to tilting the planes at different angles the lifting effect of the same may be varied by flexing the front and rear edges of each plane downwardly and presenting a curved concave face or side to the wind. This flexing of the planes is preferably effected by means of cords or lines 42, 43 connected respectively with arms 44, 45, depending from the front and rear transverse ribs of each plane and extending thence toward the pivot of the plane and lengthwise of the latter over suitable guides 46, 47 on the central transverse rib and the adjacent mast to the operator's compartment, so that the operator may flex the planes, as shown in Figure 17, if desired, by pulling on the cords 42, 43. Upon releasing the latter the resilience of the longitudinal ribs of the planes again straightens the same, as shown in Figure 16.

In order to reduce the wind resistance the masts and arms which support the planes and other supporting members are enclosed by a guard 48 which encloses the respective supporting member and tapers both forwardly and rearwardly from its wide central part, as shown in Figure 4, whereby the plane supports offer a minimum resistance to the progress of the machine through the air.

49 represents a pair of propellers which move the machine forwardly and which are mounted on brackets 50 projecting laterally from opposite sides of the machine in rear of the foremost set of planes. The motor 51 for driving the propellers is arranged within the main frame between the operator's compartment and the propellers and may be operatively connected with the latter in any suitable manner. This motor is of the internal combustion or hydrocarbon type and its gasoline supply or liquid fuel tank 52 is arranged above the same within the frame. Suspended from the underside of the main frame near opposite ends thereof are two gasolene storage tanks or reservoirs 53, 54 from which the gasolene may be withdrawn as required and delivered to the supply tanks 52 by means of a pump 55 in the operator's compartment. By this means the weight of the gasolene is distributed over the length of the main frame and prevents unbalancing the machine.

56 is the upright rudder with cross arms 57 for steering the machine which is pivoted vertically to the rear part of the main frame and bifurcated, so that it can straddle the conical rear end of the frame or body, as shown in Figure 1. The pivot of the rudder is provided on diametrically opposite sides with arms, which are connected with cords 58 leading to the operator's compartment to permit the operator to turn the rudder as desired.

For the purpose of enabling the operator while seated in his compartment to observe the space ahead of the machine without necessitating turning his head toward either side of the machine two mirrors 59, 60 are employed one of which is mounted at an angle in the frame in the front part of the operator's compartment while the other is arranged on top of the frame, the angular relation of these mirrors being such that the scene in front of the machine will be reflected by the upper mirror 59 above the frame to the lower mirror within the frame and thus be visible to the operator while looking straight ahead, as shown in Figures 1 and 15. These mirrors are pivoted on supports carried by the main frame, so that the periscopes can be adjusted to various angles desired and may be held in position by making the pivotal joints sufficiently tight that the mirrors are held frictionally in their adjusted position. One of the important problems to be solved, in aerial navigation, is that of the stability of the aerodyne, both as regards its longitudinal axis, and transversely; i. e., to keep it from pitching and rolling. Figs. 1 and 2 disclose a method of automatically regulating, or rectifying these.

Figure 19:
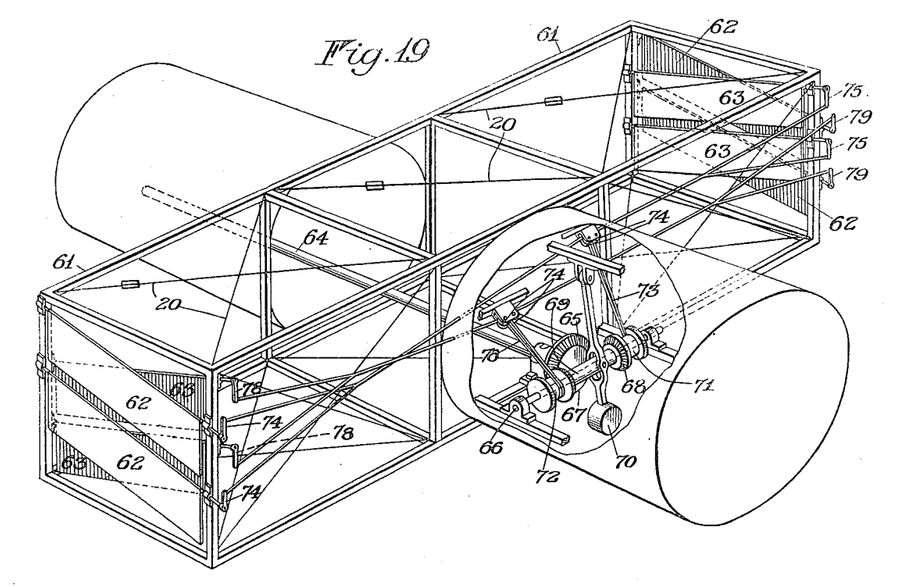
Figure 19 is a fragmentary perspective view showing the stabilizing means.

The means shown in Figures 1, 2 and 19 for maintaining stability of the machine while flying in the air are constructed as follows:—

61 represents lateral extensions of the main frame arranged in the rear of the central set of planes. On the outer part of these frame extensions are mounted two sets of stabilizing planes or wings 62, 63 which are pivoted lengthwise of the machine and adapted to operate in opposite directions. The outer set 62 contains two planes which are arranged one above the other and are pivoted at their upper edges, so that their axes incline downwardly from their front ends toward their rear ends while the other inner set 63 contains two planes which are arranged one above the other and are pivoted at their upper edges, so that their axes incline upwardly from their front ends toward their rear ends.

Normally both of the stabilizing planes are in a vertical position and do not affect the flight of the machine. If the machine should turn downward abnormally on that side of the body the outer planes 62 are turned outwardly, so that their undersides incline from their front ends downwardly to their rear ends whereby the wind acting against these sides tends to lift this side of the machine. If the machine should turn upwardly abnormally on that side of the body the outer stabilizing planes would be lowered into a pendent position and the inner stabilizing planes 63 would be turned inwardly, so that their upper sides would incline from their front ends upwardly toward their rear ends and thus cause the wind operating on the upper sides of the planes to depress this side of the machine.

These planes for stabilizing the craft may be operated either manually or automatically. In the drawings means are shown for automatically shifting the stabilizing plane to the right of the machine (which means are best shown in Figure 19) and comprise a constantly rotating shaft 64 which may be driven by the motor 51 or otherwise and which is provided with a main driving bevel gear wheel 65, a transvese shaft 66 capable of sliding transversely of the machine and provided with oppositely facing driven bevel gear pinions 67, 68 which are adapted to engage alternately with opposite sides of the main gear wheel 65, a shifting sleeve 69 loosely mounted on the transverse shaft between said gear pinions, a pendulum or weighted lever 70 pivoted at its upper end on the main frame to swing vertically crosswise of the body or frame and having its lower part pivotally connected with the shifting sleeve, drums 71, 72 arranged on opposite ends of the transverse shaft, cords or lines 73 passing with their intermediate parts around guide pulleys or wheels 74 in one direction while their opposite ends are connected with arms 74, 75, secured respectively to the downwardly inclined outer stabilizing planes on one side of the machine and the upwardly inclined inner stabilizing planes on the other side of the machine, cords or lines 76 passing with their intermediate part around guide pulleys or wheels 77 on the frame and wound at one end around the drum 72 in the opposite direction while their opposite ends are connected with arms 78, 79 secured respectively to the upwardly inclined inner stabilizing planes on one side of the machine and the downwardly inclined outer stabilizing planes on the other side of the machine.

When the machine is flying on an even keel the pendulum is arranged in its central position and both bevel gear pinions are out of mesh with the main or master gear wheel. If, however, the machine careens or lists toward one side or the other, the movement of the pendulum in the same direction causes one of the gear pinions to be moved into mesh with the main gear wheel, so that one set of shifting cords are wound up on one drum and the other set of shifting cords are unwound from the other drum, whereby the outer downwardly inclined stabilizing planes on one side of the machine and the inner upwardly inclined planes on the opposite side of the machine are turned laterally so as to present their flat operative sides to the action of the wind and thus cause the machine to be righted. When this occurs the action of the pendulum again disengages the active gear pinion from the main gear wheel thereby permitting the stabilizing planes which have just been active to again drop by gravity into their vertical inoperative position. When the machine careens or lists toward the opposite side the automatic shifting mechanism operates to turn the other stabilizing planes from their pendent inactive position into their lateral active position for righting the machine, the parts being again restored to their normal position after such righting has been effected in the manner described.

The machine is provided with a second compartment 81 in tandem with the said first mentioned compartment, and also one or more carrying cases 103; it may run over the ground on wheels 90 and 91 moving in slides 92. At each side of the said wheels are equilibrating shoes 100.

In my 1897 application I show several means for transmitting heavy bodies through the air: aeroplanes helicopters, dirigibles, aeroplanes and helicopters combined, and aeroplanes and dirigibles combined. Aerial vehicles are shown having an operator aboard and are self contained, and aerial vehicles are shown without operators but directional from the earth to great distances. Aeroplane systems are shown rigidly attached to the car or body portion, as well as aeroplane systems flexibly connected thereto.

In the said 1897 application are shown among other features: Cars or body portions of tubular form and modifications thereof: tubular bodies elongated horizontally, cylindrically shaped bodies with tapered ends, a plurality of cylindrical bodies attached one to the other, large and smaller cars or bodies mounted adjacent one to the other, adjacently spaced bodies one carrying the operator and one carrying the driving means, bodies mounted normally at a zero angle of incidence, flattened bodies with pointed advancing edges, bodies whose lower portions form aerosurfaces, bodies in the form of aeroplanes carrying operators inside the same, bodies rectangular in shape, tubular bodies elongated vertically, bodies of circular cross section, of elliptical cross section, of diamond cross section, conical shaped bodies, pyramidal shaped bodies, cubical shaped bodies, spherical shaped bodies, bodies with one pointed end, and bodies with both ends pointed, bodies with short tapered forward portions and elongated tapered after portions, bodies with curved under surfaces and flat upper portions, saucer shaped bodies, bodies arranged in separate tandem compartments, bodies driven by propellers mounted at their rear ends, bodies driven by propellers mounted at their forward ends, bodies carrying engines driving one propeller, bodies carrying one engine driving a plurality of propellers, and bodies carrying a plurality of engines driving a plurality of propellers. Aeroplanes extending on each side of the longitudinal center line of the vehicle and having a depth at least equal to the width thereof, and modifications of the same, as for instance: wing shaped aeroplanes, rectangular aeroplanes, circular aeroplanes, annular aeroplanes, bowl shaped aeroplanes, aeroplanes elongated transversely, flat aeroplanes, aeroplanes curved longitudinally with their concaved sides facing downwardly, same with their convex sides facing downwardly, aeroplanes curved transversely, superposed aeroplanes, advancing edge of the upper aeroplane in advance of the advancing edge of the lower aeroplane, advancing edge of the lower aeroplane in advance of the advancing edge of the upper aeroplane, one of the superposed aeroplanes extending outwardly to a greater distance laterally than another aeroplane, openly spaced uprights connecting and spacing the superposed aeroplanes and parallel to one another, also radial uprights, aeroplanes divided in sections and mounted on each side of the car or body portion, aeroplanes mounted normally at a positive angle of incidence, aeroplanes whose rear portions are flexible, aeroplanes with retreating sides and substantially unobstructed space between the sides into which the car or body extends, an advancing edge of aerosurface fore and aft of the car, aeroplanes with smooth or unbroken surfaces from front to rear, aeroplanes with free peripheries, folding aerosurfaces, revolving aerosurfaces, aeroplanes whose dihedral angle can be varied, pivoted aeroplanes, valved aeroplanes, aeroplanes which can be moved bodily fore and aft, aeroplanes which act as stabilizers, and aeroplanes stabilized by auxiliary stabilizers. Stabilizing means in the form of flat or curved planes or their equivalents, rotating planes or propellers, and certain modifications thereof, as for instance: stabilization by means of changes in the inclination of planes, and by changes in the area of planes, changes in the position of planes, stabilization by means of a plurality of stabilizing means mounted one on each side of the longitudinal center line of the vehicle, by a plurality of stabilizing means operated simultaneously, operated reversely, operated automatically; also there are shown stabilizing means mounted inside the outer periphery of the sustaining aerosurface, stabilizing means mounted outside the said aerosurface, stabilizing means mounted adjacent to the periphery of the said surface, mounted adjacent to the lateral edges of the said surface, stabilizing means mounted normally out of action, stabilizing means mounted opposite the car or body portion of the vehicle, stabilizing means with transverse shafts or axes, stabilizing means with longitudinal shafts or axes, stabilizing means having their advancing edges as well as substantially all of one of their surfaces when in action practically unobstructed to the impinging air from all of the directions from which the said air can come, stabilizing means for preventing rolling transformable into stabilizing means for preventing pitching, stabilizing means projecting beyond or partly beyond the outer periphery of the aeroplane, two of the stabilizing means or rudders of the vehicle mounted in the slip stream of the propelling means for driving the vehicle forwardly, stabilizing means operated through the intermediacy of a motor, and stabilization by means of the movement of planes horizontally.

In my 1897, 1905, 1909 and 1916 applications are shown many of the above mentioned features: a car or body portion mounted normally at a zero angle of incidence, and a body driven by a plurality of propellers one on each side of the longitudinal center line of the vehicle. Aeroplanes extending on each side of the longitudinal center line of the vehicle and having a depth at least equal to the width thereof, flat aeroplanes, an aeroplane curved longitudinally, a plurality of aeroplanes with the advancing edge of one in advance of the advancing edge of another, an aeroplane divided in sections and mounted one on each side of the car or body portion, an aeroplane mounted normally at a positive angle of incidence or not having a strictly horizontal projection, superposed aeroplanes or aeroplanes vertically disposed, openly spaced uprights connecting and spacing the superposed aeroplanes, an advancing edge of aerosurface mounted fore and aft of the car or body portion, aeroplanes with smooth and unbroken surfaces from front to rear, aeroplanes with free peripheries, and aeroplanes stabilized with auxiliary stabilizing means. A plurality of stabilizing means mounted one on each side of the longitudinal center line of the vehicle, means permitting the stabilizing means to be operated simultaneously, means permitting the stabilizing means to be operated automatically, stabilizing means or the shaft or axes thereof mounted outside the outer periphery of the aerosurface, stabilizing means mounted adjacent or near to the periphery of the aerosurface, stabilizing means normally out of action, stabilizing means mounted opposite the operator's section of the vehicle, stabilizing means having their advancing edges as well as substantially all of one of their surfaces when in action practically unobstructed to the impinging air from all of the directions from which the said air can come, two of the stabilizing means or rudders of the vehicle mounted in the slip stream of the propelling means for driving the vehicle forwardly, and stabilizing means operated through the intermediacy of a motor.

In the said 1897, 1909 and 1916 applications are also shown many of the aforementioned features: a car or body portion of tubular form elongated horizontally and mounted normally at a zero angle of incidence, cylindrically shaped bodies with tapering ends, large and smaller bodies mounted adjacent to one another, adjacently spaced bodies with parallel axes one carrying the operator and one the driving mechanism, bodies of circular cross section, bodies formed into separate compartments, operator's position in separated forward compartment in body, bodies carrying one engine and driving a plurality of propellers. Rectangular shaped aeroplanes elongated transversely, aeroplanes with rear portions flexible, folding aerosurfaces, pivoted aerosurfaces, and aeroplanes with auxiliary stabilizers. Stabilizers in the form of flat planes, one large plane and a plurality of smaller planes, the large plane pivoted on a transverse axis and the smaller planes pivoted on longitudinal axes, stabilizing means operated simultaneously, stabilizers operated reversely, stabilizers operated automatically by means of a swinging weight.

In the said 1905, 1909 and 1916 applications are also shown many features not spoken of in the two preceding paragraphs: a car or body or operator's portion having a plurality of propellers mounted opposite the same, a car or body portion having inclining means both at the forward portion and adjacent to the rear portion thereof. Aerosurface mounted forward of the propelling means of the vehicle and aerosurface mounted aft thereof, two aeroplanes with propelling means between the same, an aerosurface adjacent to the fore part of the vehicle another adjacent to the central portion and a third adjacent to the aft portion thereof. Stabilizing means mounted between two aeroplanes, stabilizing means mounted between a curved plane and a flat plane, stabilizing means thrown in and out by means of a clutch and a lever therefor, stabilizing means mounted in the slip stream of a plurality of propellers, stabilizing means mounted away from the car or body and away from the aeroplane system each on a separate lateral extension projecting outwardly on each side of the said car or body but independent of the said aeroplane projection.

In the said 1909 and 1916 applications are shown conjointly certain features only partially shown in the said 1897 and 1905 applications: a cylindrical car or body portion of tubular shape and mounted normally at a zero angle of incidence with rounded tapering ends, an elongated tubular car with means of sustentation at each end and adjacent to the center thereof and a body having two separated and independent compartments in tandem; aeroplanes adapted to be flexed longitudinally, aeroplanes adapted to be both flexed and pivoted, a plurality of superposed aeroplanes or aerosurfaces lengthened longer laterally than longitudinally or elongated transversely; a larger aeroplane or aerosurface and a plurality of stabilizing means comprising smaller aeroplanes or aerosurfaces, stabilizing means comprising small aeroplanes or ailerons mounted outside the outer periphery of a larger aeroplane, small aeroplanes or ailerons operated simultaneously, ailerons operated reversely, and ailerons operated simultaneously.

As my invention is, in many of its aspects, generic I do not limit myself to the particular construction shown or described, but also contemplate the employment of such equivalents as fairly fall within the scope of the claims.

In this connection I may say that I do not limit myself to closed cars as I may use open ones; nor do I limit myself to transversely elongated aeroplanes as annular or bowl shaped planes may be used; nor to the use of small flat or curved planes or ailerons, as I may use revolving planes or rotating propellers for stabilizing means, because a helicopter is but a revolving aeroplane, and for the same reason I may use orthopter stabilizing means for a flapping wing is but a pivoted or reciprocating aeroplane.

It must be understood that I may make various changes in the form, proportion, size and detail of the various structures shown, the number and position of certain elements used, as well as the character of the motive power employed, without departing from the spirt of my invention.

I claim:

1. A flying machine of the heavier-than-air type comprising a main body normally having its longitudinal axis substantially horizontal and extending in the direction of travel, a supporting plane attached to said body at a point intermediate its ends but well forward of its rear end, a second plane also attached to said body and at a point adjacent its rear end, one of said planes normally having its anterior portion higher than its posterior portion and curved from front to rear and one of said planes being pivotally attached, and a stabilizer for transverse equilibrium trailing in the rear of the first mentioned plane.

2. A flying machine of the heavier-than-air type comprising a main body normally having its longitudinal axis substantially horizontal and extending in the direction of travel, a supporting plane attached to said body at a point intermediate its ends but well forward of its rear end, a second plane attached to said body at a point adjacent its rear end, said supporting plane normally having its anterior portion higher than its posterior portion and curved from front to rear, said second plane being pivotally attached to said body, and a pair of stabilizers for transverse equilibrium disposed immediately behind and trailing in the rear of the first mentioned plane, 3. A flying machine of the heavier-than-air type comprising a frame, an aeroplane attached to said frame and normally disposed at a positive angle of incidence with reference to the direction of travel, air propelling means adapted to propel the craft through the air and thereby cause said aeroplane to lift the craft into the air, a second plane pivotally attached to said frame at a point well to the rear of said aeroplane, a pair of stabilizers for transverse equilibrium arranged on opposite sides of the longitudinal axis of the craft, said stabilizers being disposed immediately behind and trailing immediately in the rear of the aeroplane, and means for operating said stabilizers simultaneously in opposite directions.

4. A flying machine comprisng a covered body normally having its longitudinal axis substantially horizontal, a plane attached to the said body nearer the front thereof, a second plane also attached to the said body nearer the rear thereof, one of the said planes being a multiplane having one of the said planes above the said body and one below the said body, the said planes normally having their anterior portions higher than their posterior portions and curved from front to rear, and one of the said planes being pivotally attached, a pair of stabilizers for transverse equilibrium normally trailing in the rear of the said first mentioned plane, and a controlling lever operatively connected to the said stabilizers.

GEORGE FRANCIS MYERS.